United States Patent Office 3,207,742
Patented Sept. 21, 1965

3,207,742
POLYMERIZATION OF 1,3-DIENES IN THE PRESENCE OF HEXAMETHYLPHOSPHORAMIDE
John F. Van de Castle, Westfield, N.J., assignor to Esso Research and Engineering Company, a corporation of Delaware
No Drawing. Filed Mar. 26, 1962, Ser. No. 182,638
4 Claims. (Cl. 260—94.6)

This invention relates to a novel process of preparing rubbery polymers or surface coating materials of 1,3 dienes having an increased ratio of 1,2 structure. More particularly, it relates to a process of this nature employing hexamethylphosphoramide as an additional component in the process.

The polymerization of 1,3 dienes to rubbery polymers using lithium hydrocarbon catalysts is known, e.g., see Australian patent applications 22,559 and 22,560 of October, 1956. Normally polymerization of a 1,3 diene, e.g., butadiene with butyl lithium in a hydrocarbon diluent gives a product with 90% 1,4 structure and 10% 1,2. It can be desirable to increase the ratio of 1,2 addition because this increases the cure rate of surface coatings. Also, in the rubbery molecular weight range, the processability is increased as well as cure rate.

It has now been found that increased ratios in the polymers of 1,2 structure can be obtained by carrying out the polymerization in the additional presence of hexamethylphosphoramide. This is surprising because, as developed below, compounds related to hexamethylphosphoramide either gave no increase in 1,2-structure or actually poisoned the polymerization system. The yields are the same as in the absence of hexamethylphosphoramide.

The 1,3 dienes that can be used in the process of this invention include butadiene, isoprene, 2,3-dimethylbutadiene, piperylene, 2-alkyl-1,3-butadienes, 2,3-dialkyl-1,3-butadienes, etc. The process is particularly effective for isoprene and butadiene and especially useful with the latter.

The lithium hydrocarbon catalysts used are those known in the art. Typical examples thus include n-butyl lithium and other alkyl, alkaryl or cycloalkyl lithiums such as propyl lithium, isobutyl lithium, tertiary butyl lithium, amyl lithium, cyclohexyl lithium, phenyl ethyl lithium, etc. This material is utilized in an amount from 10 to 0.1 mol percent based on the dienes.

The hexamethylphosphoramide is utilized in an amount of from 10 to 0.1 mol percent based on diene, but usually 1 to 5 times the amount of catalyst gives satisfactory results. It is added to a solution of diene in the hydrocarbon solvent. Butyllithium is usually the last reagent added, however, the hexamethylphosphoramide may be added during any step.

The remaining conditions are similar to those conventionally employed. Hydrocarbon solvents such as heptane, pentane or other non-polar, non-acidic solvents such as cyclohexane, benzene, dihydronaphthalene, alkyl benzenes, petroleum ether, methyl cyclopentane, etc., may be used. Temperatures in the range of about —20° to 200° C. and pressures of 0.5 to 100 atmospheres are employed.

When the desired degree of polymerization has been reached, the polymer may be isolated by precipitation with a non-solvent such as methanol, isopropyl alcohol, water, etc. Alternately, the solution can be injected into a slurry tank containing a hot non-solvent whereupon the solvent is flashed off and the polymer remains as a slurry with the non-solvent. Alternatively, the solvent can be removed directly by the application of heat and/or flashing to a lower pressure.

The product is an amorphous, gel-free polymer. The molecular weight can range from 5,000 to 200,000 depending upon the monomer to initiator concentration.

This invention is applicable to copolymerization also. Thus any combination of dienes or dienes with styrene would give polymers containing increased amounts of 1,2 structure in the diene portion of the copolymer.

The ratio of 1,2 structure in the polymers depend on the amount of hexamethylphosphoramide utilized. Thus 50 to 75% 1,2 and even higher amounts can be obtained or lesser if desired. This gives a desirable flexibility to the operation.

This invention and its advantages will be better understood by reference to the following examples.

EXAMPLE 1

.6 of a mole of butadiene was dissolved in 250 ml. of n-heptane. The catalyst employed was butyllithium in n-heptane. The reaction was carried out in a 16 oz. bottle containing a stirring bar. The order of addition was first the heptane, butadiene, hexamethylphosphoramide, and finally butyl lithium. The bottle cap was tightened and taped with electrical tape to avoid any moisture and placed in a water bath (room temperature —25° C.) over a magnetic stirring motor. Reactions were very fast and after 24 hours the polymers were precipitated. Polymers were dried in vacuo oven overnight at 40° C. Infrared analysis, using the Hampton procedure, was performed on ca. .5 to 1% solutions in carbon disulfide.

The results were as follows:

Table I

| Mmoles Hexamethylphosphoramide | Mmoles n-Butyllithium | Percent 1,2 | [n] | Polymer weight, g. |
|---|---|---|---|---|
| 0 | 1 | 8 | 1.2 | 33.0 |
| 0.5 | 1 | 49 | 1.1 | 38.6 |
| 1 | 1 | 61 | 1.0 | 35.4 |
| 2 | 1 | 70 | 0.7 | 34.0 |
| 5 | 1 | 73 | 0.6 | 23.6 |
| 10 | 1 | 74 | 0.9 | 25.2 |
| 20 | 1 | 77 | 1.5 | 27.7 |
| 50 | 1 | 78 | 1.0 | 33.3 |

The presence of hexamethylphosphoramide, even at very low concentrations, changed the stereochemistry of the polymer to predominately 1,2-structure. The amount of 1,2-structure increased with the concentration of hexamethylphosphoramide. The yields were 70 to 98% of the control runs.

EXAMPLE 2

Compounds related to hexamethylphosphoramide were tested in similar experiments as in Example 1 to ascertain their effect. The results are summarized below in Tables II and III.

Table II

| | A | B | C | D |
|---|---|---|---|---|
| Reagents | Butadiene—0.6 mole in 250 ml. benzene n-Butyllithium—2.0 mmoles | | | |
| Third Component | Triphenyl phosphine oxide | Pyridine N-oxide | Triethyl phosphate | Triphenyl phosphine |
| Amount, mmole | 2.0 | 2.0 | 2.0 | 2.0 |
| Temperature | Room | Room | Room | Room |
| Polymer weight, g | None | None | None | 30.0 |
| IR Analysis, percent: | | | | |
| Cis 1,4 | | | | 37.0 |
| Trans 1,4 | | | | 49.0 |
| 1,2 | | | | 14.0 |

Table III

| | A | B | C | D | E |
|---|---|---|---|---|---|
| Reagents | Butadiene—0.6 mole in 250 ml. benzene n-Butyllithium—2.0 mmoles | | | | |
| Third Component | None | Triethyl phosphate | Triphenyl phosphine | Triphenyl phosphine oxide | Pyridine-N-oxide |
| Amount, mmole | | 10.0 | 10.0 | 10.0 | 10.0 |
| Temperature | Room | Room | Room | Room | Room |
| Polymer weight, g | 33.2 | None | 26.9 | None | None |
| Cis 1,4, percent | 37.4 | | 37.2 | | |
| Trans 1,4, percent | 49.1 | | 50.0 | | |
| 1,2, percent | 13.4 | | 12.7 | | |

The addition of triphenyl phosphine to the polymerization of butadiene with n-butyllithium did not alter the stereochemistry of the polymer. The same structure was obtained as with n-butyllithium alone. The addition of the other third components poisoned the polymerization.

The advantages of this invention will be apparent to the skilled in the art. By this technique, one can prepare polymers containing large amounts of 1,2 structure giving greater flexibility to the process.

It is to be understood that this invention is not limited to the specific examples which have been offered merely as illustrations and that modifications may be made without departing from the spirit of the invention.

What is claimed is:

1. In a process of polymerizing a 1,3-diene to a polymer having a molecular weight in the range of 5,000 to 200,000 in the presence of a lithium hydrocarbon catalyst and a hydrocarbon diluent, the improved method of increasing the amount of 1,2 structure in the polymer to about 50 to 75%, which method comprises carrying out the polymerization in the additional presence of hexamethylphosphoramide in an amount of from 10 to .01 mol percent based on the diene.

2. The process of claim 1 in which the 1,3-diene is butadiene.

3. The process of claim 2 in which the lithium hydrocarbon is n-butyl lithium.

4. In the process of polymerizing a 1,3-diene selected from the group consisting of butadiene, isoprene, 2,3-dimethylbutadiene and piperylene to a polymer having a molecular weight in the range of between about 5,000 and about 200,000 in the presence of a lithium hydrocarbon catalyst and a hydrocarbon diluent, the improved method of increasing the amount of 1,2 structure in the polymer to between about 50 and about 75%, which method comprises carrying out the polymerization in the additional presence of hexamethylphosphoramide in an amount of between about 10 and about 0.1 mol percent, based on the 1,3-diene.

References Cited by the Examiner

UNITED STATES PATENTS 2,958,688  11/60  Coover et al. _____ 260—93.7
2,969,346  1/61   Coover et al. _____ 260—93.7
3,036,056  5/62   Rion _____ 260—94.3

FOREIGN PATENTS 625,748  8/61  Canada.

OTHER REFERENCES

Gaylord and Mark: "Linear and Stereoregular Addition Polymers," Interscience Publishers Inc., New York, N.Y., 1959, pages 400–405.

JOSEPH L. SCHOFER, Primary Examiner.

LEWIS GOTTS, LEON J. BERCOVITZ, Examiners.